United States Patent
Ewers et al.

(10) Patent No.: US 6,681,636 B2
(45) Date of Patent: Jan. 27, 2004

(54) PRESSURE SENSING APPARATUS HAVING PRESSURE PULSE DAMPENER

(75) Inventors: Randy Ewers, Ocala, FL (US); Joe Corley, Ocala, FL (US)

(73) Assignee: Class 1, Inc., Ocala, FL (US)

( * ) Notice: Subject to any disclaimer, the term of this patent is extended or adjusted under 35 U.S.C. 154(b) by 0 days.

(21) Appl. No.: 10/050,487

(22) Filed: Jan. 16, 2002

(65) Prior Publication Data

US 2003/0131666 A1 Jul. 17, 2003

(51) Int. Cl.[7] ................................................ G01L 7/00
(52) U.S. Cl. ............................. 73/707; 73/700; 73/706
(58) Field of Search ........................ 73/707, 716, 740, 73/730, 706, 739, 756

(56) References Cited

U.S. PATENT DOCUMENTS

| | | | | |
|---|---|---|---|---|
| 2,796,765 A | * | 6/1957 | Huston | 73/707 |
| 3,335,609 A | * | 8/1967 | Nelson | 73/707 |
| 3,915,008 A | * | 10/1975 | Silverman et al. | 73/392 |
| 4,014,214 A | | 3/1977 | Pontefract | |
| 4,055,085 A | * | 10/1977 | Wetterhorn | 73/418 |
| 4,100,812 A | | 7/1978 | Gray et al. | |
| 4,166,396 A | * | 9/1979 | Baker | 73/706 |
| 4,184,375 A | | 1/1980 | Gray | |
| 4,298,030 A | | 11/1981 | Mercier | |
| 4,427,029 A | * | 1/1984 | Charney et al. | 73/707 |
| 4,475,405 A | | 10/1984 | Corpron et al. | |
| 4,627,285 A | * | 12/1986 | King | 73/707 |
| 4,668,889 A | * | 5/1987 | Adams | 310/338 |
| 5,860,799 A | | 1/1999 | Scheibe et al. | |
| 6,119,525 A | | 9/2000 | Hamma | |

* cited by examiner

*Primary Examiner*—Edward Lefkowitz
*Assistant Examiner*—Alandra Ellington
(74) *Attorney, Agent, or Firm*—Allen, Dyer, Doppelt, Milbrath & Gilchrist, P.A.

(57) ABSTRACT

An apparatus and method for pressure sensing includes a Bourdon tube connected to a source of fluid pressure for sensing pressure changes therein, the Bourdon tube containing a pressure sensitive medium, a socket having a bore therethrough and positioned to fluidly connect the Bourdon tube with the source of pressure, a diaphragm positioned in the bore between the Bourdon tube and the source of pressure so as to isolate the pressure sensitive medium from the fluid whose pressure is sensed, and a dampener positioned between the diaphragm and the Bourdon tube, the dampener having a porous metallic body effective for substantially dampening transmission of a pressure pulse from the source of pressure to the pressure sensitive medium.

11 Claims, 3 Drawing Sheets

PRESSURE SENSING APPARATUS HAVING PRESSURE PULSE DAMPENER

FIELD OF THE INVENTION

The present invention relates to the field of pressure sensing and, more particularly, to a pressure gauge for high pressure water systems such as in fire fighting equipment.

BACKGROUND OF THE INVENTION

Mechanical pressure measuring instruments such as pressure gauges have employed a sensing element a curved or twisted metallic tube which is flattened in cross section. The tube is closed at one end, and has a second end open to the fluid pressure to be sensed. As fluid pressure increases, the tube tends to become more circular in cross section and tends to straighten. The nineteenth-century French inventor, Eugene Bourdon, recognized that the motion of the closed end of such a tube in response to an applied pressure is proportional to the applied pressure and, thus, provides a measure of the pressure. The Bourdon tube still bears the inventor's name in recognition of his inventive contribution.

In many prior art pressure gauges, the fluid whose pressure is to be sensed is allowed to enter the Bourdon tube to thereby apply pressure and cause movement of the tip of the tube. With gauges of this type, water often remains trapped in the closed end of the Bourdon tube when the high pressure water system is shut down and drained. Gauges with water trapped in this manner have a tendency to freeze and be damaged by low ambient temperatures, a common problem when fighting fires in cold winter climates.

In addition, those skilled in the art know that mechanical pressure sensors are affected by oscillations caused by a pulsating source of fluid pressure. That is, the indicator needle in the pressure gauge oscillates responsive to pressure pulses in the system, thereby making it difficult or impossible to obtain an accurate pressure reading.

One approach to addressing these problems is presented in U.S. Pat. No. 4,184,375 issued to Tommy L. Gray on Jan. 22, 1980, which describes a pressure gauge having a bladder, or diaphragm, isolating the pressure sensing apparatus from the fluid whose pressure is being sensed. The sensing apparatus, including the Bourdon tube, could therefore be filled with another fluid, preferably a low temperature resistant instrument oil. The oil filling the Bourdon tube produces a dampening effect which lessens indicator needle oscillation responsive to pressure pulses in the system.

Nevertheless, the fluid-filled Bourdon tube design still suffers from susceptibility to the well known "water hammer" effect, a rapid spike in pressure generally caused by slamming a valve or nozzle closed during operation of a high pressure water system, thereby stopping large volumes of water almost instantaneously. Consequently, a pressure wave or fluid pressure pulse is generated which travels along the fluid in the system to all associated components, including the hose, supply pump, plumbing and associated water pipes, even the street water mains. Such a fluid pressure pulse is known to adversely affect pressure gauges by permanently distorting the Bourdon tube, thereby requiring replacement of the gauge.

Another approach to dampening, in addition to the use of a fluid-filled Bourdon tube, is to fill the entire pressure gauge housing with a fluid intended to dampen undesirable needle fluctuations. Predictably, such fluid-filled pressure gauges are more expensive to manufacture, and consequently must be sold at higher prices. Yet another method involves surrounding the needle pinion with a dampening agent so as to substantially absorb undesired vibrations, again resulting in increased manufacturing costs and leading to higher equipment prices.

SUMMARY OF THE INVENTION

With the foregoing in mind, the present invention advantageously provides a pressure sensing apparatus which is substantially resistant to pressure pulses in a high-pressure water system, and which provides suppression of unwanted indicator needle oscillations without the need for a fluid-filled gauge housing. In that regard, U.S. Pat. No. 4,184,375 is hereby incorporated by reference in its entirety in the description of the present invention. The present invention, therefore, provides an effective approach to substantially dampening undesirable indicator needle oscillations and damage to the apparatus caused by pressure pulses, while containing manufacturing costs for the instrument.

The pressure sensing apparatus of the present invention comprises a pressure sensitive element, preferably a Bourdon tube, a socket, a diaphragm, and a dampener. The Bourdon tube is connected to a source of fluid pressure for sensing pressure changes therein, and contains a pressure sensitive medium. The socket has a bore therethrough and is positioned to fluidly connect the Bourdon tube with the source of pressure. The diaphragm is positioned in the bore of the socket between the Bourdon tube and the source of pressure so as to isolate the pressure sensitive medium from the fluid whose pressure is sensed. A dampener is positioned between the diaphragm and the Bourdon tube, the dampener having a porous body effective for substantially dampening transmission of a pressure pulse from the source of pressure to the pressure sensitive medium.

The invention also includes a dampener adapted for positioning between the pressure sensitive element and the source of pressure being sensed so as to protect the pressure sensing apparatus from a pressure pulses. The dampener comprises a metallic body having a plurality of pores extending through the body along random paths, the plurality of pores allowing passage of fluid pressure therethrough while substantially dampening a fluid pressure pulse from the source of fluid pressure.

In a pressure sensing apparatus connected to a source of fluid pressure, yet another aspect of the invention includes a method of protecting the sensing apparatus from a pressure pulse traveling along the fluid. The method comprises forming a metallic body having a plurality of pores extending therethrough, positioning the metallic body relative to the source of fluid pressure so as to require fluid pressure to pass through the plurality of pores before being sensed by the pressure sensing apparatus, and passing the fluid pressure through the plurality of pores so as to substantially dampen the pressure pulse.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION OF THE PREFERRED EMBODIMENT

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art.

Figure 1:
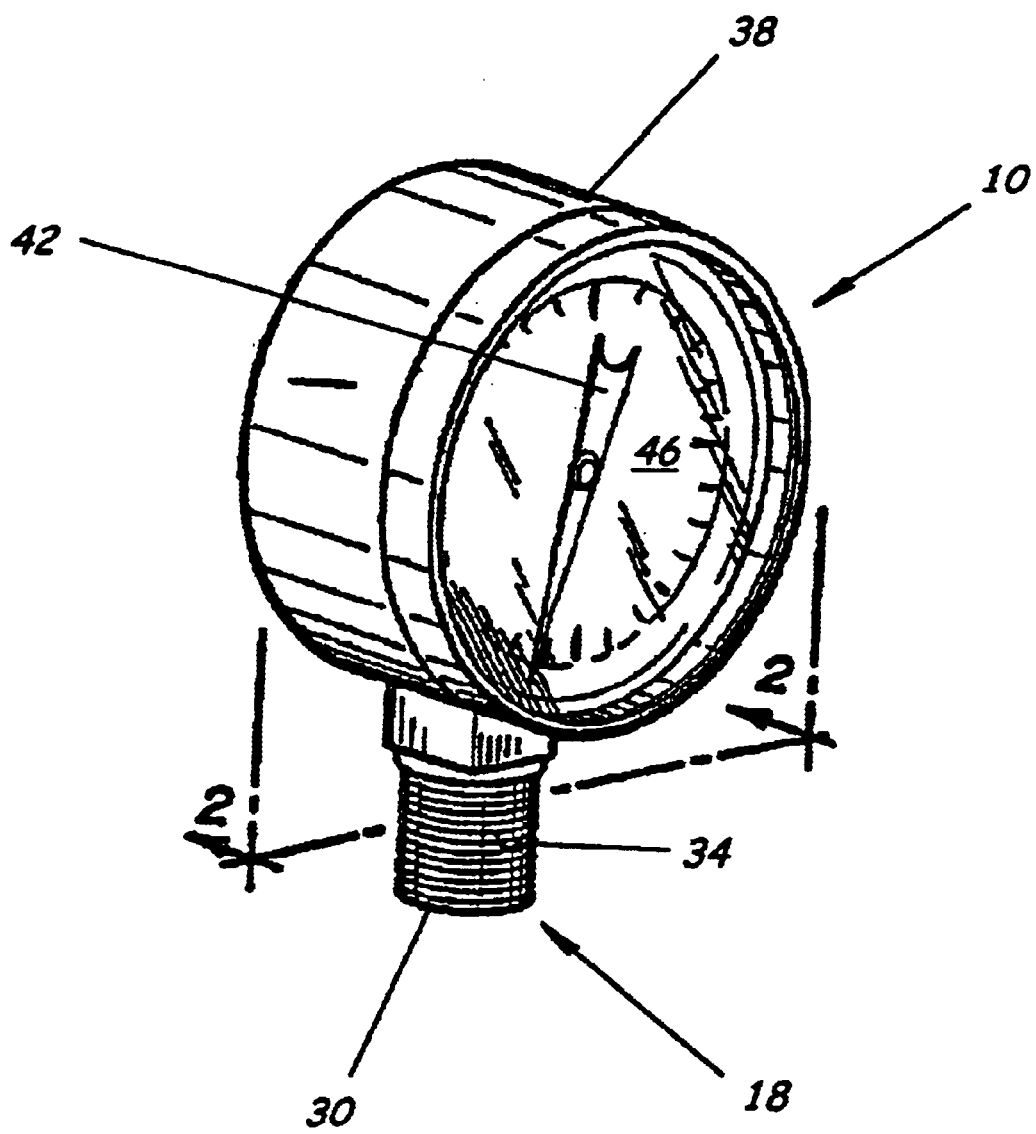
FIG. 1 is a perspective external view of a pressure gauge according to an embodiment of the present invention.
Figure 2:
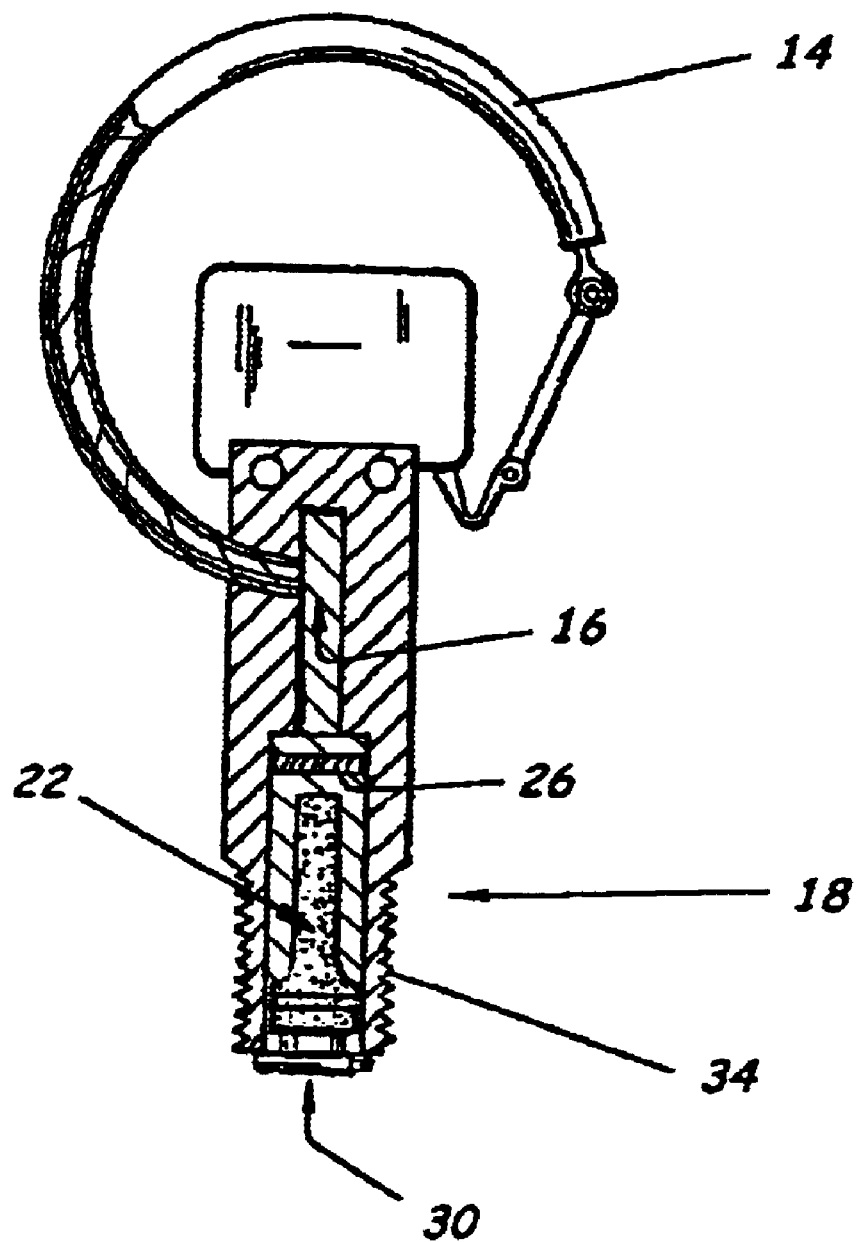
FIG. 2 is a cross sectional view of the pressure gauge of FIG. 1 cut along line 2—2 so as to show internal detail.
Figure 3:
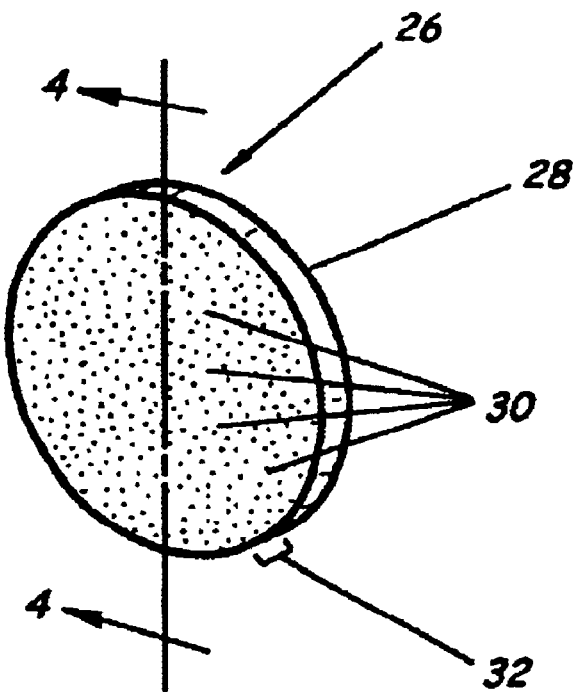
FIG. 3 shows a perspective view of a dampener according to the present invention.
Figure 4:
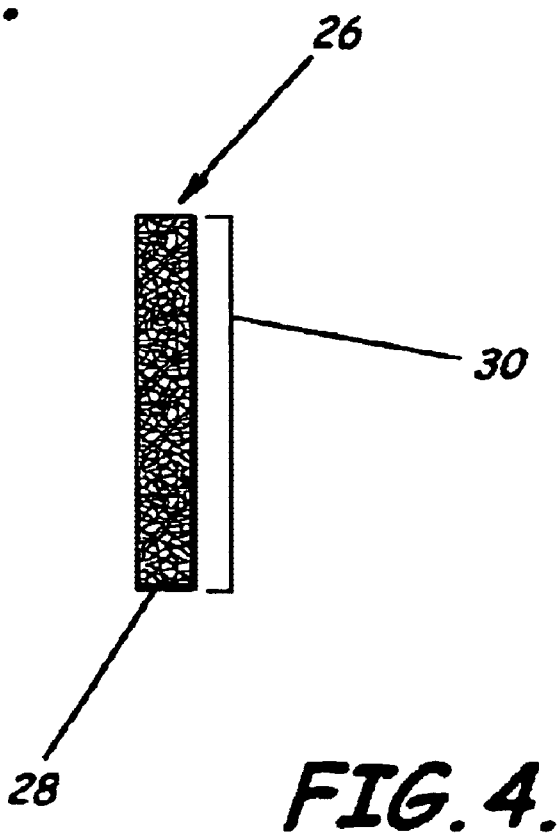
FIG. 4 is a cross sectional side view of the dampener of FIG. 3 cut along lines 4—4, showing a plurality of pores extending through the dampener body along random paths.

FIGS. 1–3 illustrate the pressure sensing apparatus 10 of the present invention. The apparatus 10 comprises a Bourdon tube 14, a socket 18, a diaphragm 22 also known in the art as a bladder, and a dampener 26. The Bourdon tube 14 is connected to a source of fluid pressure (not shown) for sensing pressure changes therein, The Bourdon tube 14 preferably contains a pressure sensitive medium 16 therein, and most preferably is filled with instrument oil resistant to low temperatures. A socket 18 having a bore 30 therethrough is positioned to fluidly connect the Bourdon tube 14 with the source of pressure. The skilled will recognize that the socket 18 preferably includes a threaded connector 34 for fluidly connecting the pressure sensing apparatus 10 into the fluid system requiring pressure monitoring. Additionally, the socket 18 is connected to a housing 38 within which the Bourdon tube 14 mechanism, indicator needle 42, and pressure scale 46 are positioned, as best shown in FIG. 1. The diaphragm 22 is positioned in the bore 30 of the socket 18, as shown in FIGS. 2 and 3. The diaphragm 22 being positioned between the Bourdon tube 14 and the source of pressure so as to isolate the pressure sensitive medium from the fluid whose pressure is being sensed. A dampener 26 is positioned between the diaphragm 22 and the Bourdon tube 14, the dampener having a porous body 28 effective for substantially dampening transmission of a pressure pulse from the source of pressure to the pressure sensitive medium. The dampener 26 is best shown positioned in the pressure sensing apparatus 10 in FIGS. 2 and 3.

The dampener 26 is adapted for positioning between the Bourdon tube 14 and the source of pressure being sensed so as to protect the pressure sensing apparatus from a pressure pulse. The invention is preferably for use in a high-pressure fluid system such as in a fire engine pumper truck, which must provide high pressure water for fire fighting. The term "pressure fluctuation" is, thus, intended to include pressure changes within the system which can cause undesirable indicator needle oscillations in the pressure sensing apparatus, or even damage the apparatus. Such pressure fluctuations may be relatively minor pulsations, or may be sudden and large pressure spikes such as the above described water hammer effect. The dampener 26 comprises a preferably metallic body 28 having a plurality of pores 30 extending through the body along random paths, the plurality of pores allowing passage of fluid pressure therethrough while substantially dampening a fluid pressure pulse from the source of fluid pressure. The metallic body of the dampener 26 preferably comprises sintered metallic powder, and may comprise a plurality of metals. Further, the dampener 26 metallic body most preferably comprises a disc having a thickness 32 predetermined for a desired dampening, as shown in FIG. 3. It should be understood that dampener 26 is fabricated so as to be substantially pressure resistant.

Another aspect of the present invention includes, in a pressure sensing apparatus connected to a source of fluid pressure, a method of protecting the sensing apparatus from a pressure pulse traveling along the fluid. The method comprises forming a metallic body having a plurality of pores extending therethrough, positioning the metallic body relative to the source of fluid pressure so as to require fluid pressure to pass through the plurality of pores before being sensed by the pressure sensing apparatus, and passing the fluid pressure through the plurality of pores so as to substantially dampen the pressure pulse.

In the method, forming may further comprise the plurality of pores extending along random paths through the metallic body. Further, forming the metallic body preferably further comprises sintering metallic powder into a disc shape, the disc in particular having a thickness to provide a predetermined magnitude of dampening. Those skilled in the art will know that the terms "sintering" or "wintered" are used herein in their common meaning, which includes to weld together a metallic powder partially and without melting. However, it is intended that the metallic body of dampener 26 may be fabricated preferably from powdered metal by any available method useful to produce the body having the described plurality of pores therethrough.

Finally, in a pressure sensing apparatus connected in a high-pressure fluid system, a method of protecting the sensing apparatus from a pressure fluctuation within the system includes requiring the fluid to pass through a metallic body having a plurality of pores before reaching the sensing apparatus, the plurality of pores having an orientation and average pore diameter effective for allowing passage of fluid pressure therethrough while substantially dampening the pressure fluctuation so as to thereby protect the pressure sensing apparatus.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. A pressure sensing apparatus comprising:
   a Bourdon tube connected to a source of fluid pressure for sensing pressure changes therein, said Bourdon tube containing a pressure sensitive medium;
   a socket having a bore therethrough and positioned to fluidly connect said Bourdon tube with the source of pressure;
   a diaphragm positioned in said bore between said Bourdon tube and the source of pressure so as to isolate said pressure sensitive medium from the fluid whose pressure is sensed; and
   a dampener positioned between said diaphragm and said Bourdon tube, said dampener having a porous body comprising metallic powder effective for substantially dampening transmission of a pressure pulse from the source of pressure to said Bourdon tube.

2. The pressure sensing apparatus of claim 1, wherein said dampener porous body comprises sintered metallic powder.

3. The pressure sensing apparatus of claim 1, wherein said dampener is positioned within said socket bore.

4. The pressure sensing apparatus of claim 1, wherein said dampener porous body comprises a plurality of pores extending through said body along random paths and having an average pore diameter effective to thereby allow passage of fluid pressure therethrough while substantially dampening a fluid pressure pulse from the source of fluid pressure.

5. The pressure sensing apparatus of claim 1, wherein said Bourdon tube is responsive to a fluid pressure sufficient for sensing in high pressure fire fighting equipment.

6. The pressure sensing apparatus of claim 1, wherein the pressure sensitive medium comprises oil.

7. The pressure sensing apparatus of claim 1, wherein the pressure sensitive medium comprises oil resistant to low temperature.

8. A dampener adapted for positioning between a pressure sensing apparatus having a Bourdon tube and a source of pressure being sensed thereby so as to protect the pressure sensing apparatus from a pressure pulse, comprising:

a metallic body comprising sintered metallic powder and having a plurality of pores extending through said body along random paths, said plurality of pores effectively sized for allowing passage of fluid pressure therethrough while substantially dampening a fluid pressure pulse from the source of fluid pressure.

9. The dampener of claim 8, wherein the metallic body further comprises a plurality of metals.

10. The dampener of claim 8, wherein said metallic body further comprises a disc having a thickness predetermined for a desired dampening.

11. In a pressure sensing element connected to sense pressure in a fluid pressure system, a method of protecting the sensing element from a pressure pulse within the system, the method comprising:

requiring the fluid to pass through a pressure resistant metallic body having a plurality of pores before reaching the sensing element, the plurality of pores having an orientation and average pore diameter effective for allowing passage of fluid pressure therethrough while substantially dampening the pressure pulse so as to thereby protect the pressure sensing element.

\* \* \* \* \*